Aug. 18, 1970     H. THUMMEL     3,525,088

PLASTIC REFLECTIVE ELEMENT

Filed Jan. 5, 1968     5 Sheets-Sheet 1

Inventor
HELMUT THUMMEL

Aug. 18, 1970     H. THUMMEL     3,525,088
PLASTIC REFLECTIVE ELEMENT

Filed Jan. 5, 1968     5 Sheets-Sheet 5

United States Patent Office 3,525,088
Patented Aug. 18, 1970

3,525,088
PLASTIC REFLECTIVE ELEMENT
Helmut Thummel, Ehingen (Danube), Germany, assignor to Firma Heinrich Benzing, Ehingen (Danube), Germany, a firm of Germany
Filed Jan. 5, 1968, Ser. No. 695,958
Claims priority, application Germany, Jan. 19, 1967, B 90,794
Int. Cl. F21v 7/00; G02b 5/12
U.S. Cl. 240—103        8 Claims

ABSTRACT OF THE DISCLOSURE

A cycle fender formed from a bowed plastic strip having a smooth outer surface. A metal foil, embossed into prismatic projections, is embedded in the plastic strip. The cycle fender may also be made with several strips of embedded metal foil which may be used simultaneously as reflective surfaces and as electrical conductors.

---

Figure 1:
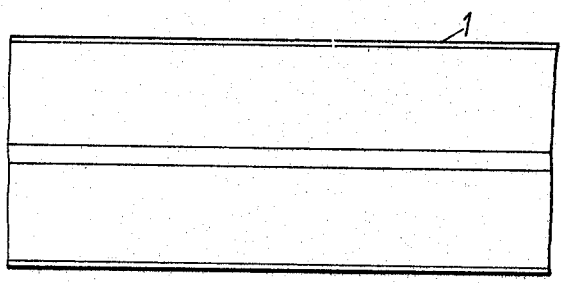

The present invention relates to reflectors made of plastic, and more particularly to reflectors useful as rear-reflectors on vehicles, bicycles, or generally useful for traffic control, and of sufficient strength to be self-supporting.

It has previously been proposed to make bicycle fenders, and other light-self-supporting structures of plastic; in order to give better stability and stiffness to such structures, it has been proposed to include stiffening wires, such as steel wires therein. Such steel wires have merely structural functions, and any reflective or optical functions are solely due to the pigmentation of the plastic itself.

It is an object of the present invention to provide a plastic reflective element capable of being shaped to form a cycle fender which has a high degree of reflectivity, which is inexpensive, and structurally sufficiently strong to permit use without additional supports and stiffening members; and additionally, if desired, is capable of acting as an electrical conductor.

SUBJECT MATTER OF THE PRESENT INVENTION

Briefly, in accordance with the present invention, a plastic, flat, transparent sheet, which may be elongated, is provided which has a metal foil embedded therein. In accordance with a preferred feature of the invention, particularly useful in connection with such reflective elements which have to be very highly reflective, the metal foil is embossed to have a prismatic shape, with the plastic covering the prismatic embossing, so that a high degree of reflectivity is obtained. The plastic may be colored, and still be transparent; or the metal foil itself may be colored and the plastic entirely clear. A suitable material for the metal foil is a thin foil of aluminum.

Covering the aluminum with transparent plastic not only provides for a structurally strong unit, but prevents corrosion, or dulling of the highly reflective aluminum surface. The plastic can be made sufficiently thick and the entire assembly is thus structurally strong enough to be shaped, self-supportingly, to form the fender or mud-guard of a bicycle. If the metal foil is split centrally along the length of the fender, the aluminum foils forming the reflective surface can serve as a pair of electrical conductors for tail light assemblies, which can be mounted directly on the plastic-metal embedded fender. Connections can readily be made to the metal foils in the plastic, at any desired point. In order to make electrical connection, a washer is used which has projecting prongs arranged along its circumference, for example four prongs which penetrate through the plastic, piercing the metal foil (and at that time making contact therewith) and sufficiently long so as to project beyond the other surface of the plastic sheet, where the prongs can be bent over to provide for a secure attachment. To provide for additional stiffness, longitudinal ridges can be formed in the plastic strip, which ridges can at the same time serve as locating ridges (or, grooves, at the other side) for connecting blocks or electrical appliances, such as tail-light assemblies.

The reflective element of the present invention may be used not only as tail-reflectors for vehicles, but also generally as warning devices, and, in any case in locations where inexpensive highly reflective materials are desired—for example in the form of tags or strips to be attached to trees, to act as scarecrows, to frighten deer or other animals away from highways and the like.

The aluminum foil can be extremely thin and still carry the required amount of current, since its lateral extent can be made considerable—in case of a bicycle fender a pair of aluminum foils of about an inch in width, each, can be provided. Since both the foil and the plastic can readily be cut, manufacture of any length reflective element is simple, and attachment of electrical connectors can be made at any desired point. By making the plastic not only pliable, but also soft and elastic, openings made therethrough, for example to form an electrical connection, will be closed over, since piercing of the plastic layer involves only elastic deformation thereof.

To mount the reflective element on a support, for example by means of a screw-bolt and provide for insulation, a pair of flanged insulating bushings or washers can be slipped over the bolt, so that any through-bolts are insulated from the electrically conductive foil. By making these insulating bushings, or washers, of similar plastic material, and tightening of the bolt, an entirely waterproof joint is provided. One of the surfaces of the plastic can also be supplied with an adhesive, so that the entire reflective assembly can be adhered to various supports, or follow the structural shape of a surface which is to be made reflective.

Figure 2:
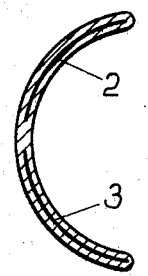
Figure 3:
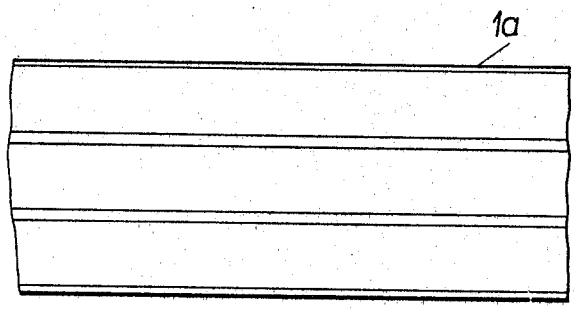
Figure 4:
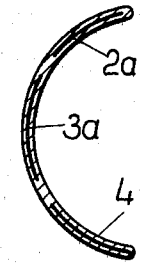
Figure 8:
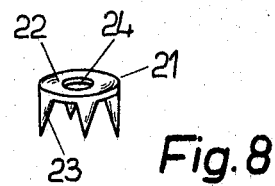
Figure 5:
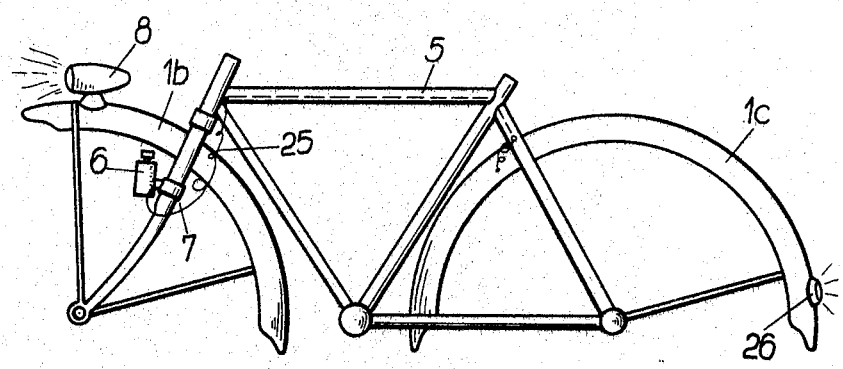
Figure 6:
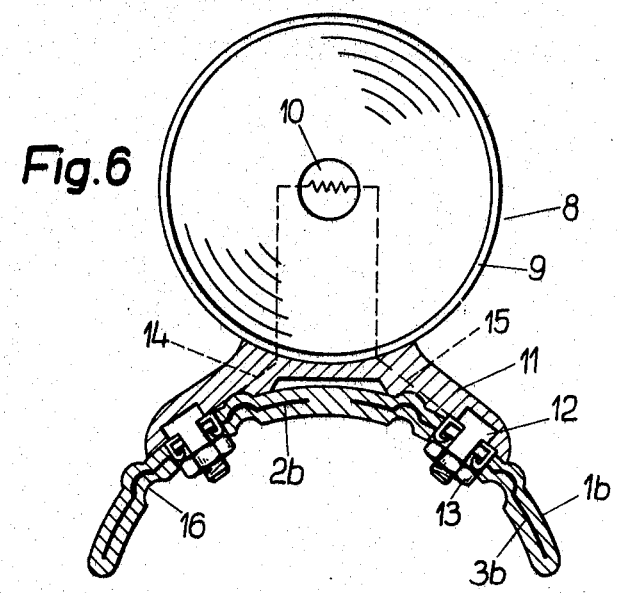
Figure 13:
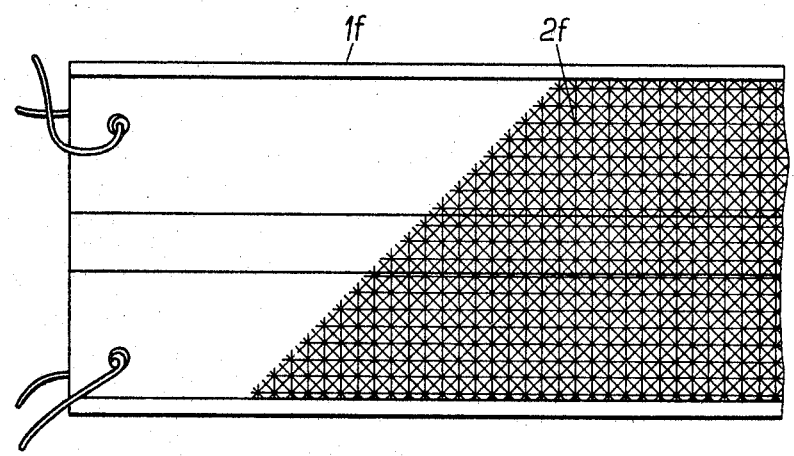
Figure 7:
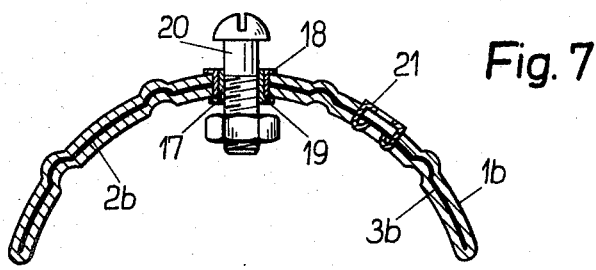
Figures 9, 10:
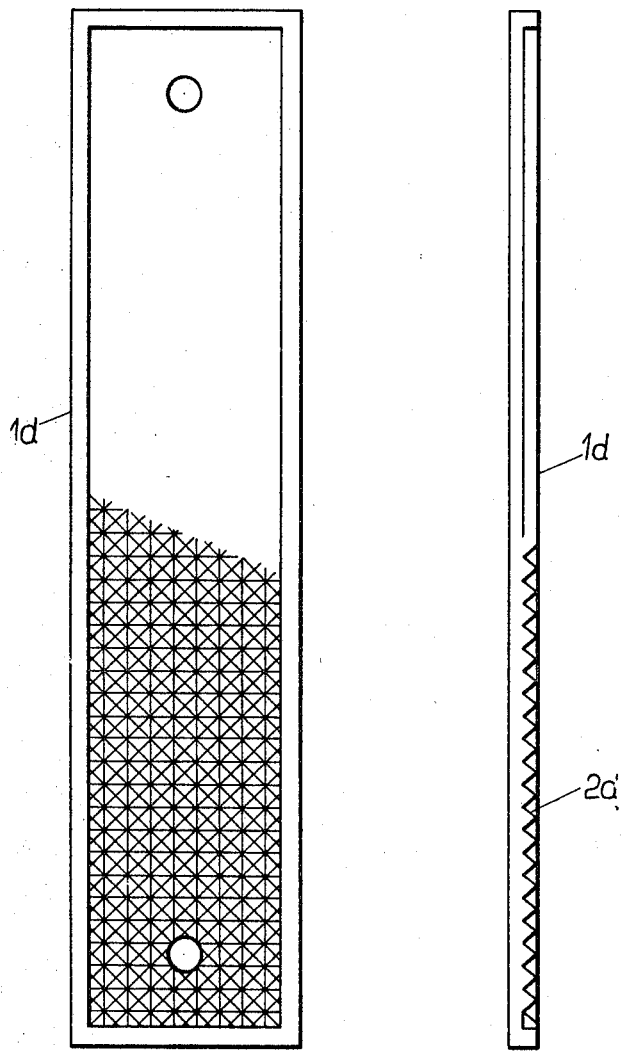
Figure 11:
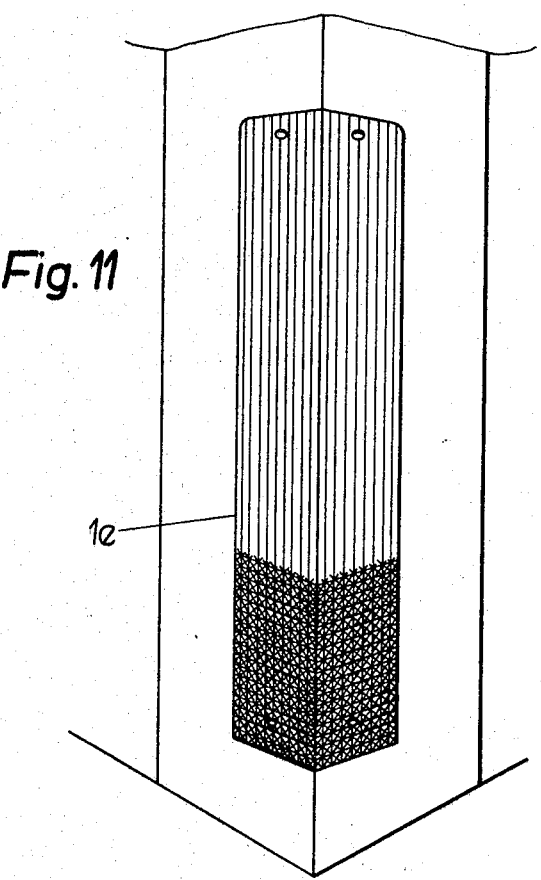
Figure 12:
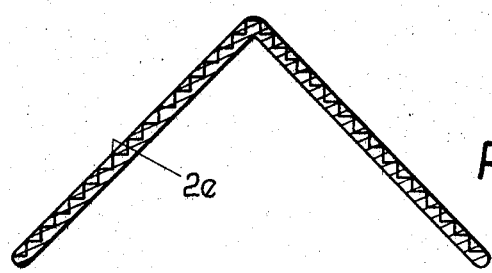

The structure, organization, and operation of the invention will now be described more specifically with reference to the accompanying drawings, wherein:

FIG. 1 is a plan view of a reflective bicycle fender in accordance with the present invention;
FIG. 2 is a cross sectional view thereof;
FIG. 3 is a modified embodiment of the fender of FIG. 1;
FIG. 4 is a cross sectional view of FIG. 3;
FIG. 5 is a partly schematic view of the reflector, forming part of an electrical circuit for a bicycle;
FIG. 6 is a cross sectional view, partly schematic, of a rear bicycle fender with a tail-light assembly;
FIG. 7 is a cross sectional view of a rear fender with an attachment bolt;
FIG. 8 is a perspective view of a piercing-type connecting washer;
FIG. 9 is a plan view of another embodiment of the present invention;
FIG. 10 is a longitudinal cross sectional view of FIG. 9;
FIG. 11 illustrates an application of the reflector of FIGS. 9 and 10;
FIG. 12 is a view of the reflector of FIG. 11, in cross section; and
FIG. 13 is an illustration of a reflector, for use as a self-supporting warning strip.

Referring now to the drawings and particularly to FIGS. 1 and 2: A bowed transparent plastic layer 1 has a pair of metal foils 2, 3, in strip form embedded therein. Strips 2 and 3 preferably have the same width and extend almost entirely across the width of foil 1, being separated centrally by plastic material. The plastic material, itself, is transparent, or translucent, at least at the convex side of the curvature (as seen in FIG. 2) when to be used as a bicycle fender. FIGS. 3 and 4 illustrate a modified embodiment, in which the plastic covering 1a includes three separate strips 2a, 3a and 4a, the three strips extending essentially entirely across the width of the fender, and any two of them being capable of forming a complete electrical circuit. For example the center strip 3a may be a common connector, and strips 2a, 4a connect to a brake light and a tail, and license light of the rear fender of a motorcycle. The use of a semicircular plastic reflecting strip in accordance with FIGS. 1 through 4, in combination with a bicycle, is illustrated in FIG. 5. The front fender 1b, having a foil embedded therein, is connected by means of cable 7 to the free terminal of a generator 6. The other foil is connected, not specifically shown in the drawing for simplicity, to the frame of the bicycle, for example at one or more of the connection points of the fender with the bicycle frame 5. A headlight 8 is secured directly to the fender and electrically connected to the two metal foils, as will appear in connection with FIG. 6.

The connection of fenders to electrical appliances such as lamps, as well as their mechanical connection to the bicycle frame is illustrated in connection with FIGS. 6 through 8. Lamp 8 has a housing 9 to receive an electrical light bulb 10. A base 11 fits over the fender 1b. Base 11 is provided with molded bolts 12, arranged on the base in such a manner that they are above the region of the current carrying foil strips 2b, 3b in the plastic reflective assembly, and being similar in all respect to foils 2, 3 of FIGS. 1 and 2. Bolts 12 extend through the fender and are held thereon by counter nuts 13. Electrical conductors 14, 15 interconnect bolts 12 with the socket for bulb 10, so that bulb 10 is connected by means of the reflective foils 2b, 3b to the circuit of generator 6.

To improve the stiffness of an elongated reflective strip, made of plastic, the strip is formed with longitudinally extending ridges, having matching grooves at the other side, and seen at 16, FIGS. 6 and 7. Preferably, these grooves are arranged to be in the region of the metal foils and the base 11 of the electrical appliance, that is lamp 8, has matching grooves so as to locate the lamp centrally of the fender assembly.

Connection of the fender assembly to the fender braces 5a, 5b, for example, is best done by means of insulating bushings 17, 18 (FIG. 7) one fitting within the other and co-axially pushed within each other to separate a through-bolt 20 electrically from the metal foils 2b, 3b. Laterally extending flanges 19 seal the insulating bushings to the fender strip. These insulating bushings are preferably of plastic material, somewhat pliable, for example of the same material as the plastic material forming the covering for the reflecting strips. To provide for positive electrical connection of the lamp, for example of the bolts 12, connecting elements in the form of washers are provided, as best seen in FIG. 8. A washer 22 having transversely extending projecting prongs 23, and a central hole 24 is inserted beneath the nut 13 and over the bolt 12. The length of the points 23 is somewhat greater than the entire thickness of the fender, so that the ends of the points 23 will project therethrough, to be bent over, hooklike, into the plastic material when the nuts 13 are tightened.

Upon assembly, the connecting part 21 is first pressed into the fender 1b at the point where current is to be taken off, or supplied thereto. After the element 21 is pressed through, the projecting points 23 are bent, hook-like, back into the plastic to provide for secure attachment of element 21. Points 23, penetrating through and piercing the electrically conductive foils make electrical contact therewith so that electrical current can be taken off directly from element 21, for example by the screw connection 12, 13.

To provide for current supply to a tail-light, it has been customary to run a wire, or cable around the rear fender brace 5c; this is not only unsightly, but often leads to damage; alternative embodiments, by securing a wire to the rounded fender 1c have been proposed but were not entirely satisfactory. In accordance with the present invention, the rear fender is formed of a plastic in which the metal foil is embedded and a tail-light 26 is directly connected to the plastic-foil combination fender assembly, the tail-light 26 being mechanically secured to the fender and electrically supplied by connections similar to the connections discussed with regard to headlight 8. Current is supplied to the rear fender by means of connecting wire 25, the other terminal being, for example, an un-insulated connection to the frame of the bicycle 5, that is a bolt connection using a bolt 20 but without the insulating bushings 17, 18, but rather with the connecting bushing 21.

FIGS. 9 and 10 illustrate a flat reflective element 1d, of rectangular outline, and having a metal foil 2d embedded therein. Metal foil 2d is slightly smaller than the plastic 1d, and embossed, as best seen in FIG. 10, to provide for prismatic reflective surfaces. This embodiment provides for a high degree of reflectivity. Connecting, or attachment openings H may be performed therein.

A particularly useful application of the reflector of the present invention is to provide a corner-reflector element, for example for columnar supports. Referring to FIGS. 11 and 12, a pre-formed corner element 1e of transparent plastic has a prismatically embossed metal foil 2e molded thereinto. Again, such a corner reflector may be provided with attachment holes, as shown, or the backing may be formed with an adhesive, for example of the self-sticking kind for adhesion to structural surfaces.

FIG. 13 illustrates a flexible and bendable foil in the form of tags. The transparent plastic material 1f has a prismatically embossed metal foil 2f embedded therein. This tag is particularly useful for attachment to trees, or temporary traffic diversions, as warning signals, and to frighten deer and other animals away from highways.

The present invention has been described particularly in connection with reflective structural elements for use as mud-guards or fenders for bicycles, motorcycles and the like, and as reflective warning elements for direct attachment to structures, or for use as tags. Various structural changes and modifications, as determined by the requirements of particular applications or uses may be made without departing from the inventive concept.

I claim:

1. Cycle fender wherein said fender is formed of a strip of transversely bowed, elongated transparent plastic material;

and at least one strip of metal foil (2, 3, 2a, 3a, 4) having a reflective surface embedded in said plastic material.

2. Cycle fender according to claim 1 wherein said metal foil is embossed to provide prismatic reflecting surfaces.

3. Cycle fender according to claim 1 wherein a plurality of adjacent parallel strips are embedded in said plastic material to provide separate conductors of electrical circuits.

4. Cycle fender according to claim 1 wherein said plastic strip has at least one stiffening ridge formed therein, extending along the major dimension of said strip.

5. Cycle fender according to claim 1 wherein said strip is of sufficient strength to be self-supporting, said metal foil extending essentially over the entire width of said strip.

6. Cycle fender according to claim 5 including a plurality of longitudinally extending ridges, projecting beyond the outwardly bowed surface of said strip, and forming stiffening and locating ridges for said fender.

7. Cycle fender according to claim 1 having at least two parallel, adjacent foil strips embedded in said plastic material, in combination with a lamp fixture having a base, said base being formed with grooves matching said projecting ridges; and electrically conductive mounting means arranged on said base in regions to overlay said metallic foil strips; means penetrating said sheet and making electrical contact with said foil therein and electrically interconnecting said foil strips to said base.

8. Cycle fender according to claim 7 including electrical connection means comprising a circular washer having pointed projections extending therefrom and arranged around the circle of said washer, said projections being longer than the thickness of said strip and said projections penetrating through said strip and said foil, and being bent back at the opposite side of said strip.

References Cited

UNITED STATES PATENTS

| 1,553,610 | 9/1925 | Harley | 240—8.3 |
| 2,859,423 | 11/1958 | Hyman. | |
| 3,226,287 | 12/1965 | Shanok et al. | 161—4 XR |

FOREIGN PATENTS

| 573 | 1/1911 | Great Britain. |
| 652,089 | 4/1951 | Great Britain. |

NORTON ANSHER, Primary Examiner

R. P. GREINER, Assistant Examiner

U.S. Cl. X.R.

161—4; 339—97; 350—97